(12) United States Patent
Ohkoba (10) Patent No.: US 10,460,637 B2
(45) Date of Patent: Oct. 29, 2019

(54) IMAGE PROJECTION APPARATUS (71) Applicant: CANON KABUSHIKI KAISHA, Tokyo (JP)

(72) Inventor: Minoru Ohkoba, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/102,854

(22) Filed: Aug. 14, 2018

(65) Prior Publication Data

US 2019/0066553 A1 Feb. 28, 2019

(30) Foreign Application Priority Data

Aug. 24, 2017 (JP) ................... 2017-160685

(51) Int. Cl.
*G03B 21/14* (2006.01)
*H04N 9/31* (2006.01)
*G09G 3/00* (2006.01)
*G03B 21/20* (2006.01)
*G03B 21/00* (2006.01)

(52) U.S. Cl.
CPC ........... *G09G 3/003* (2013.01); *G03B 21/005* (2013.01); *G03B 21/142* (2013.01); *G03B 21/2033* (2013.01); *G09G 3/002* (2013.01); *G09G 3/007* (2013.01); *H04N 9/3105* (2013.01); *H04N 9/317* (2013.01); *H04N 9/3188* (2013.01)

(58) Field of Classification Search
CPC .... G03B 21/14; G03B 21/005; G03B 21/008; G03B 21/145
See application file for complete search history.

(56) References Cited

U.S. PATENT DOCUMENTS

| 5,583,694 | A | 12/1996 | Takahashi et al. |
| 5,626,411 | A | 5/1997 | Takahashi et al. |
| 7,052,142 | B2* | 5/2006 | Gupta ............... G03B 21/20 |
| | | | 348/E5.137 |
| 8,994,764 | B2 | 3/2015 | Watanabe |
| 9,354,494 | B2* | 5/2016 | Mashitani ........... G03B 21/142 |
| 9,860,499 | B2 | 1/2018 | Mizoguchi |
| 2017/0003579 | A1* | 1/2017 | Abe .................. G02B 26/0875 |
| 2019/0049824 | A1* | 2/2019 | Yamamoto .......... H04N 9/3102 |

FOREIGN PATENT DOCUMENTS

| JP | 2000278614 A | 10/2000 |
| JP | 2011203460 A | 10/2011 |

* cited by examiner

*Primary Examiner* — William C. Dowling
(74) *Attorney, Agent, or Firm* — Rossi, Kimms & McDowell LLP (57) ABSTRACT

An image projection apparatus includes a light modulation element, and a pixel shift unit configured to shift an optical path of light from a pixel in the light modulation element and to shift a position on a projection surface of a projection pixel formed on the projection surface by a projection optical system with the light. The pixel shift unit includes an optical element configured to shift the optical path in one direction among directions orthogonal to an optical axis from the light modulation element to the projection optical system, and a rotating unit configured to change the one direction by rotating the optical element around the optical axis.

16 Claims, 6 Drawing Sheets

FIG. 9

IMAGE PROJECTION APPARATUS

BACKGROUND OF THE INVENTION

Field of the Invention

The present invention relates generally to an image projection apparatus (referred to as a "projector" hereinafter), and more particularly to a resolution enhancement technology for a projection (projected) image.

Description of the Related Art

Japanese Patent Laid-Open No. ("JP") 2011-203460 discloses a projector that can shift a pixel in a projection image by shifting an optical path of image light modulated by a light modulation element, such as a liquid crystal panel, so that the projection image is displayed with a resolution higher than that of the light modulation element. This projector includes a pixel shift (wobbling) unit (or device) that shifts the optical path of the image light, provided between a dichroic prism that combines R, G, and B image light fluxes with one another and a projection optical system that projects the image light from the dichroic prism onto a screen.

However, the pixel shift unit in the projector JP 2011-203460 shifts the optical path only in one reciprocating direction, and thus can makes the resolution of the projection image at most twice as high as that of the light modulation element. This optical-path shifting method can suffer from the image quality (resolution) degradation due to the crosstalk of the image light in shifting the optical path. In order to elude the image degradation caused by the crosstalk, a blanking period in which no image projection is performed may be set when the optical path is shifted, but the brightness of the projection image can consequently lower.

SUMMARY OF THE INVENTION

The present invention provides a projector that can shift an optical path or a pixel so as to display a higher-resolution, higher-quality, and brighter projection image than ever.

An image projection apparatus according to one aspect of the present invention includes a light modulation element, and a pixel shift unit configured to shift an optical path of light from a pixel in the light modulation element and to shift a position on a projection surface of a projection pixel formed on the projection surface by a projection optical system with the light. The pixel shift unit includes an optical element configured to shift the optical path in one direction among directions orthogonal to an optical axis from the light modulation element to the projection optical system, and a rotating unit configured to change the one direction by rotating the optical element around the optical axis.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1A:
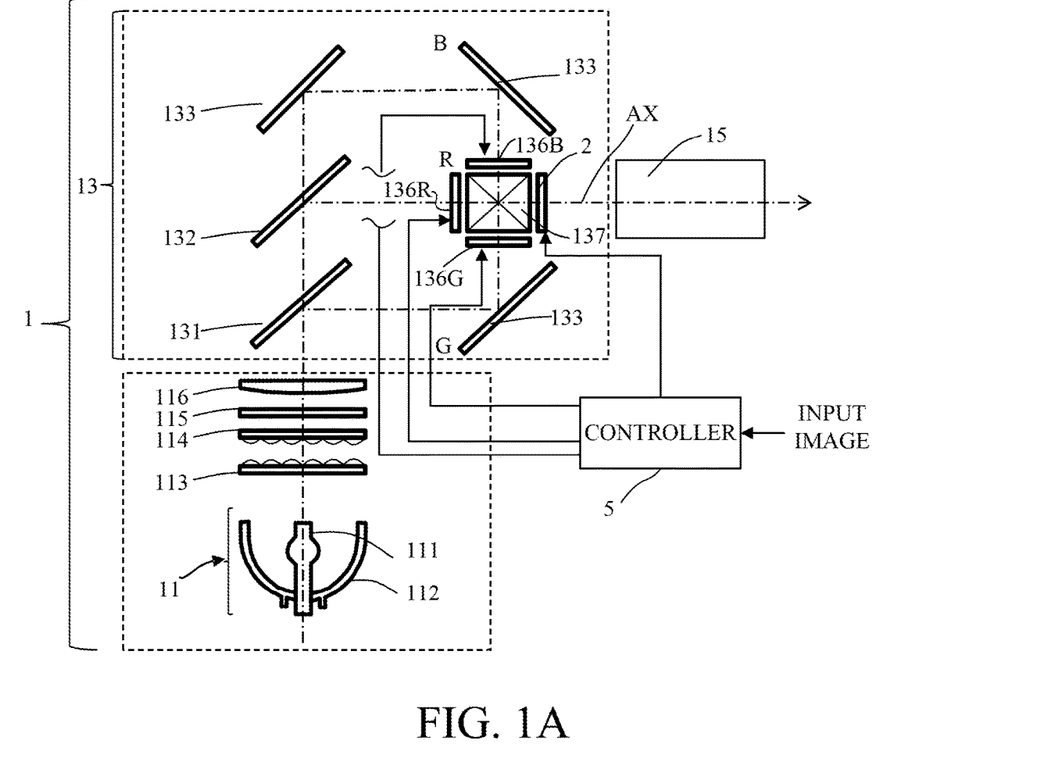
FIGS. 1A and 1B illustrate a structure of a projector and a structure of a pixel shift unit according to a first embodiment of the present invention.

FIG. 1A illustrates an image projection apparatus (referred to as a "projector" hereinafter) according to a first embodiment of the present invention. The projector 1 includes a light source unit 11, a first lens array 113, a second lens array 114, a polarization conversion element 115, a condenser lens 116, a color separating and combining optical unit 13, and a projection lens 15.

The light source unit 11 includes a light source 111 and a reflector 112. A divergent light flux emitted from the light source 111 is converted into parallel light flux by the reflector 112, and goes to the first lens array 113. This embodiment uses an ultrahigh pressure mercury lamp for the light source 111. The light source 111 may use a halogen lamp, a light emitting diode (LED), a laser diode (LD), etc. Part of the light source unit 11 may use a wavelength conversion element, such as a fluorescent body, which converts a wavelength of light from the light source into another wavelength.

A light flux entering the first lens array 113 is divided into a plurality of light fluxes by the first lens array 113, and the plurality of light fluxes form a plurality of light source images near the second lens array 114. The plurality of light fluxes that have passed the second lens array 114 are converted into polarized light having a predetermined polarization direction by the polarization conversion element 115, and superimposed on one another on each liquid crystal panel, which will be described later, by the condensing operation of the condenser lens 116. Thereby, the light flux (illumination light) having a uniform intensity distribution enters each liquid crystal panel.

The color separating and combining optical unit 13 includes a G reflection dichroic mirror 131, a R reflection dichroic mirror 132, a mirror 133, liquid crystal panels 136 (R, G, B), and a dichroic prism 137.

The G reflection dichroic mirror 131 reflects the G (green) light in white light from the light source unit 11, which has passed the condenser lens 116, and transmits the remaining light, i.e., the R (red) light and the B (blue) light. The G light is reflected by the mirror 133 and enters the liquid crystal panel 136G as the light modulation element for the G light. The R light in a mixture of the R light and the B light that has transmitted the G reflection dichroic mirror 131 is reflected by the R reflection dichroic mirror 132, and enters the R liquid crystal panel 136R. The B light that has transmitted the R reflection dichroic mirror 132 enters the B liquid crystal panel 136B.

Each liquid crystal panel 136 is driven by a drive signal generated based on an input image signal by a controller 5 that has received the image signal from the outside. Each liquid crystal panel 136 driven by the drive signal modulates the incident light and generates image light corresponding to the input image signal. The dichroic (color combining) prism 137 transmits or reflects the R image light, the G image light, and the B image light from the liquid crystal panels 136R, 136G, and 136B so as to combine them with one another and leads the combined image light to the projection lens 15 via the pixel shift unit 2, which will be described later. The projection lens (projection optical system) 15 enlarges and projects the combined image light on an unillustrated screen, etc. Thereby, the full color projection image corresponding to the input image signal is displayed.

The liquid crystal panel is not limited to the illustrated transmission type liquid crystal panel and may use a reflection type liquid crystal panel. The light modulation element may use a digital micro mirror device instead of the liquid crystal panel.

Figure 1B:
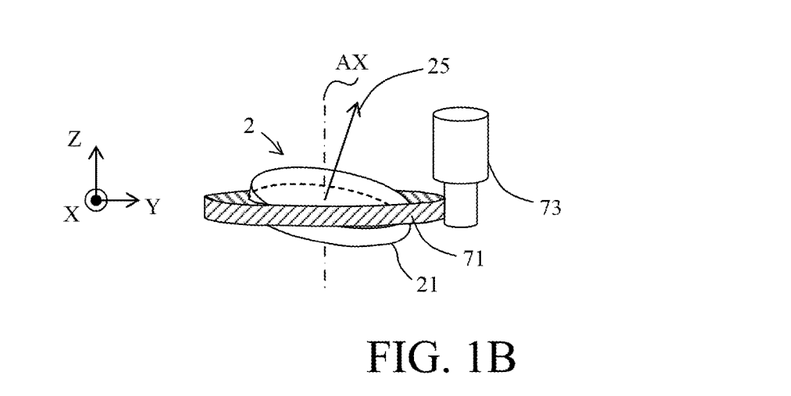

FIG. 1B illustrates the pixel shift unit (or device) 2. The pixel shift unit 2 is located on an optical axis AX between the color combining prism 137 and the projection lens 15, as illustrated in FIG. 1A. This optical axis AX is an optical axis from a normal of the light modulation surface of each liquid crystal panel 136 to the projection lens 15 via the transmission or reflection in the color combining prism 136, and it serves as the normal of the liquid crystal panel 136 (light modulation surface) or the optical axis in the projection lens 15.

The pixel shift unit 2 shifts, within a plane orthogonal to the optical axis AX, the optical path of the combined image light (simply referred to as "image light" hereinafter) that travels from the color combining prism to the projection lens 15, and shifts each pixel in the projection image on the projection surface. This configuration can display the projection image with a resolution higher than that of each liquid crystal panel 136. For example, the pixel shift unit that can achieve the double resolution enables the projection image to be displayed with a resolution corresponding to 4K or about quadruple resolution when each liquid crystal panel 136 has a resolution corresponding to the full high-definitions (HD).

A description will be given of a concrete structure of the pixel shift unit 2 according to this embodiment. The pixel shift unit 2 includes a glass plate (plane plate glass) 21 as an optical element that is a transmitting member having a plane plate shape, a holding ring (holding member) 71 that holds it, and a motor 73 that rotates the holding ring 71 (or the glass plate 21) around the optical axis AX.

The image light transmits the glass plate 21 in the optical axis direction (from −Z direction to +Z direction) along the optical axis AX. The holding ring 71 is held rotatably around the optical axis AX by an unillustrated bearing. A gear is formed on an outer circumference surface of the holding ring 71, and when this gear is engaged with a gear provided to an output shaft of the motor 73, the motor 71 can rotate the holding ring 71. A rotating unit includes the motor 73 and the holding ring 71. The controller 5 illustrated in FIG. 1A rotates the motor 73 in synchronization with a frame period of the input image signal, and thereby rotates the glass plate 21 around the optical axis AX via the holding ring 71.

The glass plate 21 is fixed and held by the holding ring 71 in a state (orientation) where the normal 25 (referred to as a "normal of the glass plate 21" hereinafter) of the entrance surface and the exit surface as the transmission surfaces inclines to the optical axis AX (Z axis). In this state, the optical path of the incident image light can be shifted or changed to one direction in which the normal 25 inclines to the optical axis AX among the directions orthogonal to the optical axis AX. As the glass plate 21 is rotated with the holding ring 71 around the optical axis AX (on the XY plane), the direction of the normal 25 of the glass plate 21 or one direction in which the optical path is shifted can be changed around the optical axis AX. As a result, the optical path of the image light that refracts in the direction of the normal 25 on the entrance surface of the glass plate 21 and refracts on the exit surface to go along the optical axis direction can be shifted around the optical axis AX. This embodiment controls the rotating position of the glass plate 21 via the motor 73 so as to shift the projection pixel to two or more positions, such as four positions, in one rotating period of the glass plate 21.

Figure 2A:
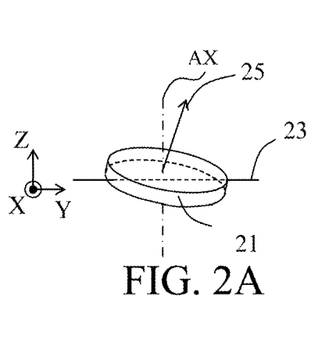
FIGS. 2A to 2H illustrate changes of an orientation of a glass plate used for the pixel shift unit according to the first embodiment.
Figure 2B:
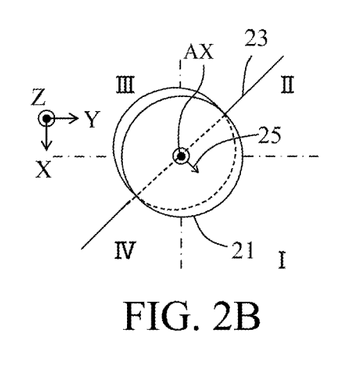

FIGS. 2A to 2H illustrate an operation of the pixel shift unit 2 according to this embodiment. FIGS. 2A and 2B are a side view (viewed from the X direction) and a top view (viewed from the Z direction) when the glass plate 21 is located at the first rotating position around the optical axis AX. At this first rotating position, the normal 25 of the glass plate 21 inclines to the optical axis AX toward the first quadrant I among first to fourth quadrants I to IV around the optical axis AX as illustrated in FIG. 2B. When a tip of an arrow that represents the direction of the normal 25 has a coordinate of (X, Y), the first quadrant I is an area in which the coordinate (X, Y) has signs (+, +). The second quadrant II is an area in which the coordinate (X, Y) has signs (−, +). The third quadrant III is an area in which the coordinate (X, Y) has signs (−, −). The fourth quadrant IV is an area in which the coordinate (X, Y) has signs (+, −).

Figure 2C:
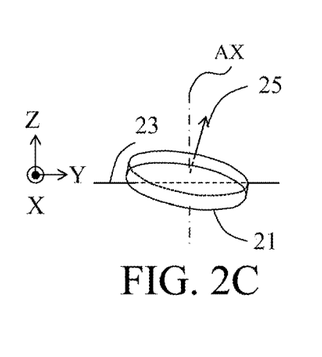
Figure 2D:
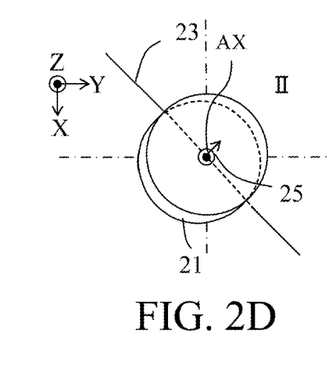

FIGS. 2C and 2D are side and top views when the glass plate 21 is located at the second rotating position after rotating by 90° from the first rotating position counterclockwise around the optical axis AX. At the second rotating position, the normal 25 of the glass plate 21 inclines to the optical axis AX toward the second quadrant II as illustrated in FIG. 2D.

Figure 2E:
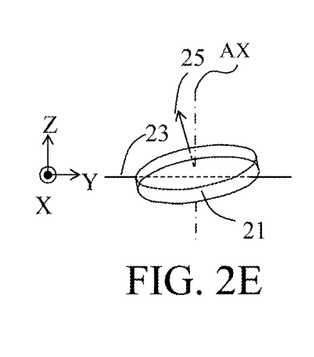
Figure 2F:
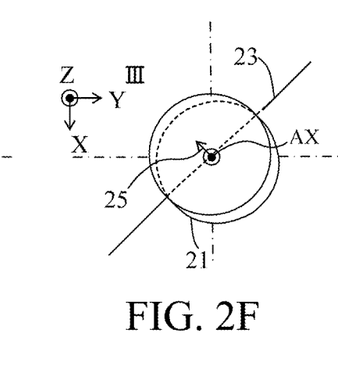

FIGS. 2E and 2F are side and top views when the glass plate 21 is located at the third rotating position after further rotating by 90° from the second rotating position counterclockwise around the optical axis AX. At the third rotating position, the normal 25 of the glass plate 21 inclines to the optical axis AX toward the third quadrant III as illustrated in FIG. 2F.

Figure 2G:
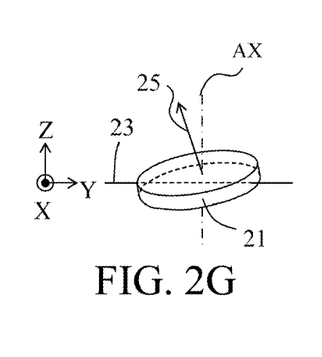
Figure 2H:
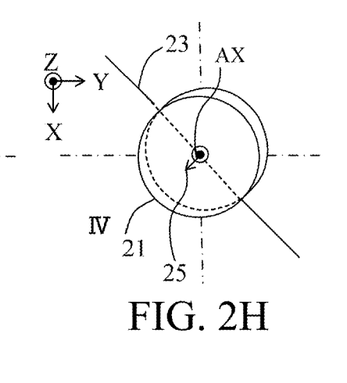

FIGS. 2G and 2H are side and top views when the glass plate 21 is located at the fourth rotating position after further rotating by 90° from the third rotating position counterclockwise around the optical axis AX. At the fourth rotating position, the normal 25 of the glass plate 21 inclines to the optical axis AX toward the fourth quadrant IV as illustrated in FIG. 2H.

Figure 3:
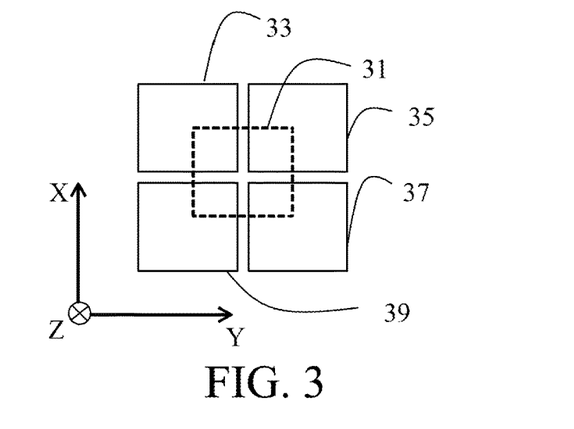
FIG. 3 illustrates a pixel shift according to the first embodiment.

FIG. 3 illustrates the pixel shift of the projection image on the projection surface by the pixel shift unit 2 according to this embodiment. In FIG. 3, a broken line frame 31 illustrates the position of a pixel in the projection image formed on the projection surface by the image light from one pixel in one liquid crystal panel or an image of a pixel in the liquid crystal panel (referred to as a "projection pixel" hereinafter) formed on the screen where no pixel shift unit is provided. Outline squares 33, 35, 37, and 39 illustrate the positions of the projection pixel when the glass plate 21 is located at the first rotating position, the second rotating position, the third rotating position, and the fourth rotating position where the pixel shift unit 2 according to this embodiment is provided.

One projection pixel can be shifted to the four positions by rotating the glass plate 21 to the first to fourth rotating positions, and by projecting the image light corresponding to the frame images with different input image signals onto the projection surface for each predetermined time at each rotating position. In other words, the projection image can be displayed with a resolution quadruple as high as that of the projection image without the pixel shift unit.

Figure 8A:
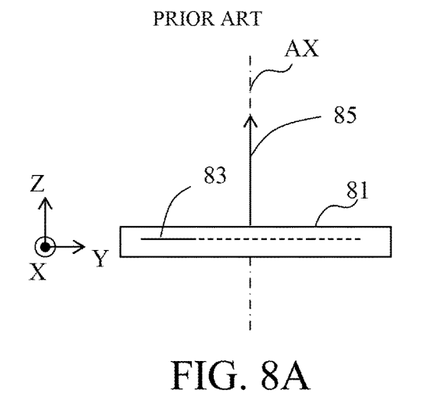
FIGS. 8A to 8D illustrate a conventional pixel shift unit.
Figure 8B:
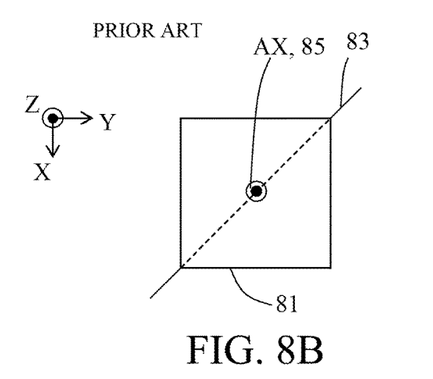
Figure 8C:
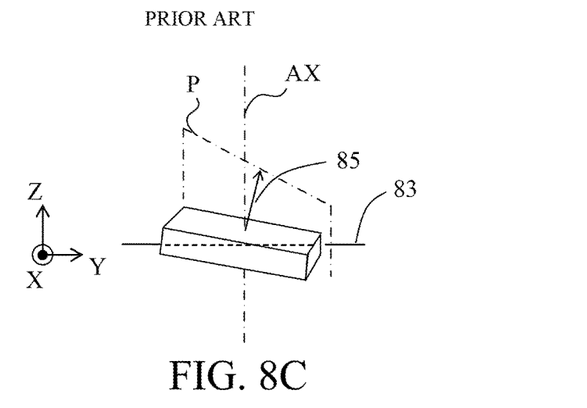
Figure 8D:
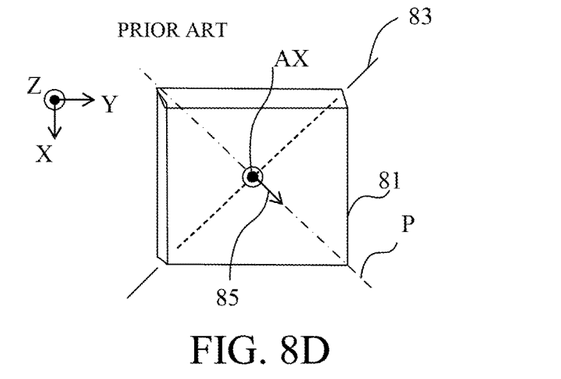

A description will now be given of the conventional pixel shift unit and the pixel shift using the same disclosed in JP 2011-203460. FIGS. 8A to 8D illustrate the conventional pixel shift unit. FIGS. 8A and 8B are a side view (viewed from the −X direction) and a top view (viewed from the −Z direction) at an uninclined position of a glass plate (plane plate) 81 used for the pixel shift unit. FIGS. 8C and 8D are a side view and a top view at an inclined position of the glass plate 81. Assume that the image light transmits the glass plate 81 from the −Z direction to the +Z direction.

The glass plate 81 swings around one swing axis 83 set on the XY plane orthogonal to the optical axis AX (Z axis) and switches between the uninclined state and the inclined state. Thereby, a direction of a normal 85 of the glass plate 81 changes in one reciprocating direction or a direction along a plane P that is orthogonal to the swing axis 83 and contains the optical axis AX as illustrated in FIGS. 8C and 8D. More specifically, the normal 85 accords with the optical axis AX at the uninclined position, and inclines to the optical axis AX in the direction along the plane P (toward the first quadrant I illustrated in FIG. 2B) at the inclined position.

Figure 9:
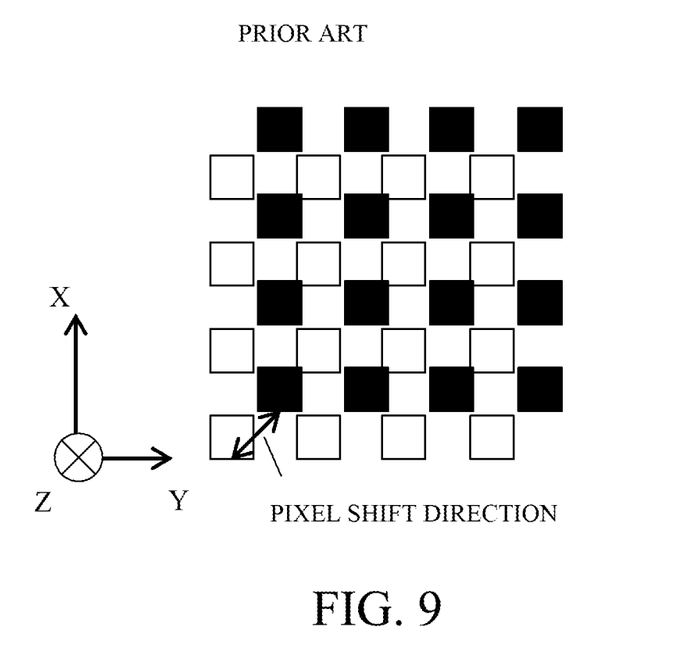
FIG. 9 illustrates a pixel shift with the conventional pixel shift unit.

FIG. 9 illustrates the projection pixel shift on the projection surface due to the operation of the conventional pixel shift unit (or the swing of the glass plate 81) illustrated in FIGS. 8A to 8D. Each outline square in FIG. 9 represents the position of the projection pixel when the Mass plate 81 is not inclined as illustrated in FIGS. 8A and 8B. Each black square indicates the position of the projection pixel when the glass plate 81 is inclined as illustrated in FIGS. 8C and 8D. When the glass plate 81 switches between the uninclined orientation and the inclined orientation, as illustrated in FIG. 9, the projection pixel shifts in a (diagonal) direction of 45° relative to the X direction and Y direction.

A pixel shift amount at this time is determined by the (glass) thickness of the glass plate 81 and the (normal) open angle of the normal 85 to the optical axis AX. In FIGS. 8A to 8D and 9, the direction of the swing axis 83, the glass thickness, and the normal open angle are set so as to shift the pixel by half the pixel pitch in the diagonal direction.

The number of pixels in the apparent projection image becomes double by swinging the glass plate 81 so as to repetitively switch the uninclined state and the inclined state, and by projecting the image light for each predetermined time in each state. In other words, the resolution of the projection image can be twice as high as that of the projection image without the pixel shift unit.

Thus, the conventional pixel shift unit changes the direction of the normal 85 of the glass plate 81 only in one direction (reciprocating direction) along the plane P that contains the optical axis. On the other hand, the pixel shift unit 2 according to this embodiment can change the direction of the normal 25 of the glass plate 21 in a plurality of directions around the optical axis AX (or a plurality of radial directions around the optical axis AX as a center). Thereby, the resolution of the projection image can be additionally twice as high as that with use of the conventional pixel shift unit (or quadruple as high as that with no pixel shift unit according to this embodiment).

The projection image can have a higher resolution by arranging two conventional glass plates in the optical axis direction so that the image light can sequentially transmit it and the swing axes of these glass plates extend in two different directions from (or orthogonal to) each other. However, use of the two glass plates makes complicate the structure of the pixel shift unit and controls over swinging of these two glass plate. In addition, it becomes difficult to dispose the pixel shift unit in a space between the color combining prism 137 and the projection lens 15 illustrated in FIGS. 1A and 1B.

Numerical Example 1

A description will be given of numerical example 1 as a concrete numerical example (simulation result) according to this embodiment. A 4K resolution liquid crystal panel with a pixel pitch of 3.8 μm (half pixel pitch of 2.69 μm in the diagonal direction) is used for the liquid crystal panel. The glass plate is made of an optical glass material BK7 (refractive index of 1.5) with a Mass thickness of 1 mm. The glass plate is fixed while its normal is inclined to the optical axis by 0.23°, and the glass plate is rotated around the optical axis.

In this case, the normal of the glass plate to the optical axis forms angles of +0.23° and −0.23° when the glass plate is rotated to the first rotating position and the third rotating position that are diagonally located via the optical axis, and the difference between them is 0.46°. The projection pixel is shifted by half a pixel pitch by rotating the glass plate to these rotating positions. The angular relationship is similarly applied to the second rotating position and the fourth rotating position that are diagonally located via the optical axis, and the projection pixel is shifted by half a pixel pitch by rotating the glass plate to these rotating positions.

The image light is projected every predetermined time of 7.0 ms at each of the first to fourth rotating positions by rotating the glass plate at the rotating frequency of 30 Hz and by changing the image signal used to drive the liquid crystal panel for each $1/(30 \times 4) = 8.3$ ms. Thereby, the projection image has a resolution that is quadruple as high as that without the pixel shift unit.

Numerical Example 2

Next follows a description of numerical example 2 according to this embodiment. This embodiment uses the same liquid crystal panels and glass plate as those in the numerical example 1. This embodiment also uses the same rotating frequency of the glass plate of 30 Hz as that of the first embodiment. On the other hand, the liquid crystal panel is driven in accordance with the different input frame image with a frequency of 60 Hz (for each 16.6 ms).

Figure 4:
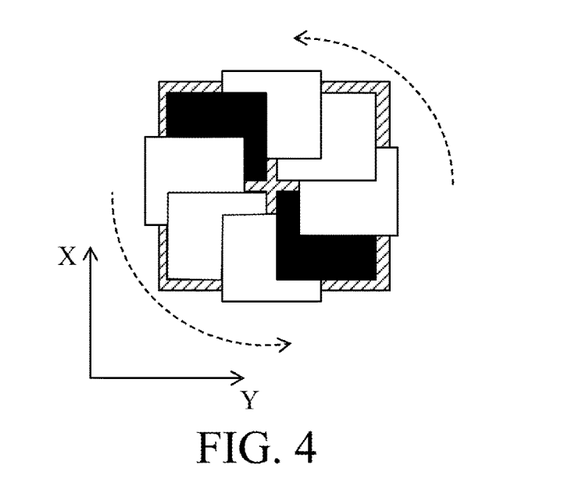
FIG. 4 illustrates a pixel shift according to a second embodiment of the present invention.

Thereby, as illustrated in FIG. 4, the glass plate is rotated so that one projection pixel draws a circle on the projection surface. The resolution may lower due to an overlapping area between the projection pixels corresponding to two image signals as illustrated by a black square (referred to as a "different image overlap area" hereinafter).

While the resolution can be enhanced in the direction that connects the upper right to the lower left in FIG. 4 by rotating the glass plate around the optical axis, the resolution is less likely to be lower than that in the following comparative example in order to make the different image overlap area in the upper left and lower right parts.

Comparative Example

Figure 5:
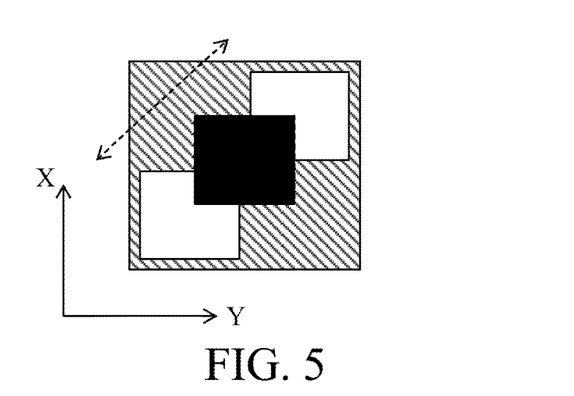
FIG. 5 illustrates a pixel shift according to a comparative example.

FIG. 5 illustrates a projection pixel shift on the projection surface where the glass plate does not rotate around the optical axis and reciprocates or swings between the uninclined state)(0°) in which the normal accords with the optical axis and the two inclined states in which the normal form predetermined angles (+A° and) −A° with the optical axis.

In this case, the different image overlap area is indicated by a black rectangle in a period necessary to swing between each uninclined state and the inclined state. This different image overlap area overlaps the area used to improve the resolution indicated by the outline rectangle and causes the resolution degradation. As a result, the resolution degradation is visually confirmed in comparison with the numeral example 2.

Second Embodiment

Next follows a description of a second embodiment according to the present invention. The first embodiment fixes the direction of the normal 25 of the glass plate 21 in the pixel shift unit 2 inclined to the optical axis AX or the rotating position of the glass plate 21 around the optical axis AX to the first to fourth rotating positions used to shift the projection pixel to four diagonal positions. However, the controller 5 illustrated in FIG. 1A may set (control) the rotating position of the glass plate 21 around the optical AX in accordance with the user input or input image signal.

Thereby, the shift direction of the projection pixel can be set or restricted in accordance with the user input or input image signal so as to enhance the resolution of the projected image. For example, where there is longitudinal and lateral line-shaped patterns on the projection surface, the shift direction of the projection pixel can be set so as to reduce the moiré between the projection surface and the projection image and the image quality degradation caused by the moiré can be prevented.

Third Embodiment

Next follows a description of a third embodiment according to the present invention. When an object longitudinally (vertically) moves in a projection image as a motion image, a viewer cannot clearly recognize the effect even when the longitudinal resolution is enhanced but he is likely to recognize the effect when the lateral (horizontal) resolution is enhanced.

Therefore, according to this embodiment, the controller 5 illustrated in FIG. 1A controls the rotating position of the glass plate 21 or the normal inclining direction of the glass plate 21 to the optical axis AX in accordance with the input image signal so as to enhance the resolution in a direction orthogonal to the object moving direction in the projection image. In other words, the shift direction of the projection pixel is limited to the direction orthogonal to the moving direction. Thereby, the resolution enhancement effect can be obtained through the projection pixel shift in projecting the motion image.

Fourth Embodiment

Figure 6A:
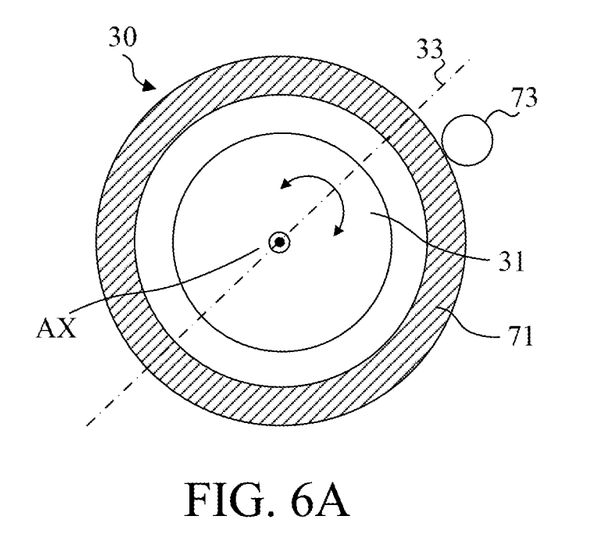
FIGS. 6A and 6B illustrate a pixel shift unit according to a fourth embodiment of the present invention.
Figure 6B:
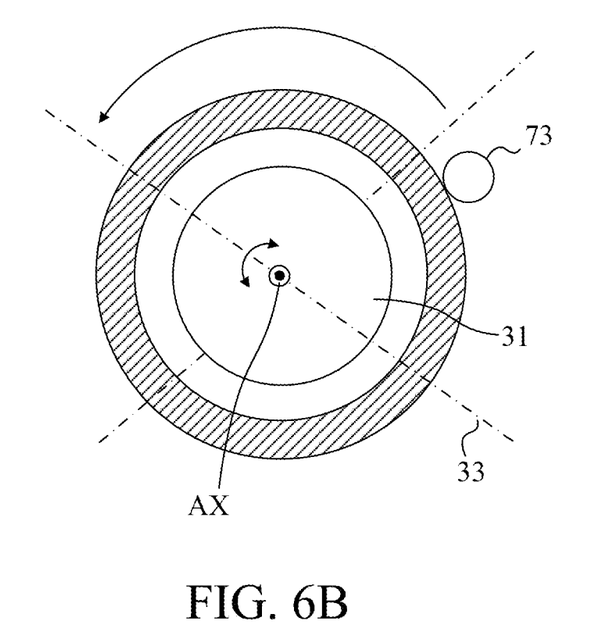

FIG. 6A illustrates the pixel shift unit 30 according to a fourth embodiment of the present invention. The pixel shift unit 30 according to this embodiment is held by a holding ring 71 so that the glass plate 31 can swing between the uninclined state and the inclined state around one swing axis 33 similar to the conventional pixel shift unit. This embodiment rotates the holding ring 71 together with the glass plate 31 around the optical axis AX through the motor 73 as illustrated in FIG. 6B. As the holding ring 71 is rotated, the extending direction of the swing axis 33 also rotates.

When the glass plate 31 is swung at the rotating position illustrated in FIG. 6A, two inclination states are obtained in which the normal (25) of the glass plate 31 inclines to the optical axis AX towards the first quadrant I and the third quadrant III as illustrated in FIGS. 2A, 2B, 2E, and 2F. Two other inclination states are also obtained in which the normal (25) of the glass plate 31 inclines to the optical axis AX towards the second quadrant II and the fourth quadrant IV as illustrated in FIGS. 2C, 2D, 2G, and 2H by swinging the glass plate 31 at the rotating position illustrated in FIG. 6B. Hence, the pixel shift unit 30 according to this embodiment can make the resolution of the projected image quadruple as high as that without it similar to the pixel shift unit 2 according to the first embodiment.

The pixel shift unit according to this embodiment can be used to reduce moiré when the projection surface has longitudinal or lateral line-shaped patterns as described in the second embodiment or to enhance the resolution when the object moves in the motion image as described in the third embodiment.

Fifth Embodiment

Figure 7:
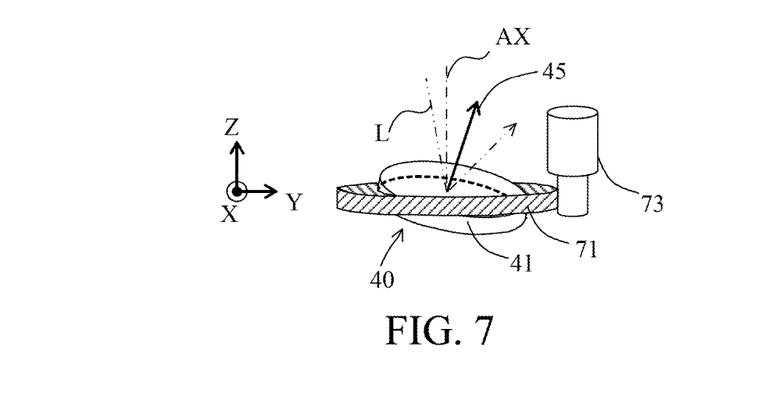
FIG. 7 illustrates a pixel shift unit according to a fifth embodiment of the present invention.

FIG. 7 illustrates a pixel shift unit 40 according to a fifth embodiment of the present invention. The first embodiment holds the glass plate 21 that transmits the image light by using the holding ring 71. On the other hand, this embodiment holds a mirror 41 as the optical element that serves as a reflecting member, by using the holding ring 71 while a normal 45 of a mirror surface (reflection surface) inclines to the optical axis AX. The holding ring 71 is rotated by the motor 73 similar to the first embodiment.

According to this embodiment, image light L entering the mirror 41 is reflected on the mirror surface of the mirror 41 and goes to the projection lens. The mirror 41 is rotated around the optical axis AX together with the holding ring 71 and the direction of the normal 45 changes around the optical axis AX and the reflection direction of the image light L or the optical path shifts. Thereby, similar to use of the pixel shift unit 2 according to the first embodiment, this embodiment can make the resolution of the projected image quadruple as high as that without the pixel shift unit.

This embodiment holds the mirror 41 while the normal of the mirror 41 inclines to the optical axis AX, but similar to the fourth embodiment, the mirror 41 may be held swingably around one swing axis and rotated around the optical axis.

While each of the above embodiments uses the glass plate or mirror for the optical element, an optical element other than the Mass plate or the mirror may be used as long as it shifts the optical path of the image light.

Moreover, the position of the optical element in the projector is not limited to a space between the color combining prism and the projection lens, and may be another position.

The above embodiments can provide an image projection apparatus that can shift an optical path or a pixel so as to display a higher-resolution, higher-quality, and brighter projection image than ever.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-160685, filed on Aug. 24, 2017 which is hereby incorporated by reference herein in its entirety.

What is claimed is:

1. An image projection apparatus comprising:
a light modulation element; and
a pixel shift unit configured to shift an optical path of light from a pixel in the light modulation element and to shift a position on a projection surface of a projection pixel formed on the projection surface by a projection optical system with the light,
wherein the pixel shift unit includes:
an optical element configured to shift the optical path in one direction among directions orthogonal to an optical axis from the light modulation element to the projection optical system; and
a rotating unit configured to rotate the optical element around an axis that is parallel to an optical axis direction, so as to change a shift direction of the optical path by the optical element.

2. The image projection apparatus according to claim 1, wherein the optical element is a transmitting member configured to transmit the light or a reflecting member configured to reflect the light, and
wherein the image projection apparatus further includes a holding member configured to hold the optical element while a normal of a transmission surface on the transmitting member or a reflection surface on the reflecting member inclines to the optical axis in the one direction.

3. The image projection apparatus according to claim 1, wherein the optical element is a transmitting member configured to transmit the light or a reflecting member configured to reflect the light, and
wherein the image projection apparatus further includes a holding member configured to swingably hold the optical element so that an inclination of a normal of a transmission surface on the transmitting member or a reflection surface on the reflecting member changes to the optical axis in the one direction.

4. The image projection apparatus according to claim 1, further comprising a controller configured to control a rotating position of the optical element by the rotating unit so as to shift the projection pixel at two or more positions in one rotating period of the optical element by the rotating unit.

5. The image projection apparatus according to claim 4, wherein the controller controls the rotating position of the optical element so as to shift the projection pixel at four positions in the one rotating period.

6. The image projection apparatus according to claim 1, further comprising a controller configured to control a rotating position of the optical element by the rotating unit in accordance with a user input.

7. The image projection apparatus according to claim 1, further comprising a controller configured to control a rotating position of the optical element by the rotating unit in accordance with an input image signal.

8. The image projection apparatus according to claim 1, wherein the rotating unit is configured to rotate the optical element around the axis such that the optical element is rotated on a plane perpendicular to the optical axis.

9. An image projection apparatus comprising:
a light modulation element; and
a pixel shifter configured to shift an optical path of light from a pixel in the light modulation element and to shift a position on a projection surface of a projection pixel formed on the projection surface by a projection optical system with the light,
wherein the pixel shifter includes:
an optical element configured to shift the optical path in one direction among directions orthogonal to an optical axis from the light modulation element to the projection optical system; and
a holder configured to hold the optical element and a motor configured to rotate the holder to thereby rotate the optical element around an axis that is parallel to an optical axis direction, so as to change a shift direction of the optical path by the optical element.

10. The image projection apparatus according to claim 9, wherein the optical element is a transmitting member configured to transmit the light or a reflecting member configured to reflect the light, and
wherein the holder is configured to hold the optical element while a normal of a transmission surface on the transmitting member or a reflection surface on the reflecting member inclines to the optical axis in the one direction.

11. The image projection apparatus according to claim 9, wherein the optical element is a transmitting member configured to transmit the light or a reflecting member configured to reflect the light, and
wherein the holder is configured to swingably hold the optical element so that an inclination of a normal of a transmission surface on the transmitting member or a reflection surface on the reflecting member changes to the optical axis in the one direction.

12. The image projection apparatus according to claim 9, further comprising a controller configured to control the motor so as to control a rotating position of the optical element to thereby shift the projection pixel at two or more positions in one rotating period of the optical element.

13. The image projection apparatus according to claim 12, wherein the controller controls the motor so as to control the rotating position of the optical element to thereby shift the projection pixel at four positions in the one rotating period.

14. The image projection apparatus according to claim 9, further comprising a controller configured to control the motor so as to control a rotating position of the optical element in accordance with a user input.

15. The image projection apparatus according to claim 9, further comprising a controller configured to control the motor so as to control a rotating position of the optical element in accordance with an input image signal.

16. The image projection apparatus according to claim 9, wherein the motor is configured to rotate the holder to thereby rotate the optical element around the axis such that the optical element is rotated on a plane perpendicular to the optical axis.

* * * * *